(12) United States Patent
Hajikano

(10) Patent No.: US 9,221,306 B2
(45) Date of Patent: Dec. 29, 2015

(54) TIRE PRINTING METHOD AND TIRE PRINTING APPARATUS

(71) Applicant: BRIDGESTONE CORPORATION, Chuo-ku, Tokyo (JP)

(72) Inventor: Akihiko Hajikano, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/359,948

(22) PCT Filed: Nov. 28, 2012

(86) PCT No.: PCT/JP2012/080672
§ 371 (c)(1),
(2) Date: May 22, 2014

(87) PCT Pub. No.: WO2013/088950
PCT Pub. Date: Jun. 20, 2013

(65) Prior Publication Data
US 2015/0165830 A1    Jun. 18, 2015

(30) Foreign Application Priority Data

Dec. 16, 2011 (JP) .................................. 2011-275590
Apr. 19, 2012 (JP) .................................. 2012-096023

(51) Int. Cl.
*B41J 29/393* (2006.01)
*B60C 13/00* (2006.01)
(Continued)

(52) U.S. Cl.
CPC .............. *B60C 13/001* (2013.04); *B29D 30/72* (2013.01);
(Continued)

(58) Field of Classification Search
CPC ......... B41J 3/4073; B41J 11/20; B04J 25/308
See application file for complete search history.

(56) References Cited

U.S. PATENT DOCUMENTS

| 6,510,996 B1 | 1/2003 | Lee et al. |
| 2008/0023124 A1 * | 1/2008 | Lacagnina et al. ......... 156/130.5 |
| 2008/0048388 A1 * | 2/2008 | Gauss et al. .................. 271/227 |

FOREIGN PATENT DOCUMENTS

| JP | 04-223142 A | 8/1992 |
| JP | 2001-113608 A | 4/2001 |

(Continued)

OTHER PUBLICATIONS

English translation of International Preliminary Report on Patentability for PCT/JP2012/080672 dated Jun. 26, 2014.
(Continued)

*Primary Examiner* — Julian Huffman
(74) *Attorney, Agent, or Firm* — Sughrue Mion, PLLC

(57) ABSTRACT

A tire printing method capable of highly precise printing by quickly and accurately measuring the profile of the side face of a tire for printing and setting a printing clearance properly. The printing is done on the side face (3) of the tire (2) by discharging ink from nozzles of a print head (61) disposed to face the side face (3). The method includes the step of detecting side face information of the tire (2) using a two-dimensional displacement measuring sensor (51) disposed to face the side face (3) of the tire (2) and the step of adjusting the distance between the print head (61) and the side face (3) of the tire (2) by adjusting either the position of the print head (61) or the distance between the beads (24, 24) of the tire (2) based on the side face information of the tire (2).

14 Claims, 9 Drawing Sheets

(51) Int. Cl.
    *B29D 30/72*     (2006.01)
    *B41J 3/407*     (2006.01)
    *B41J 11/20*     (2006.01)
    *B41J 25/308*     (2006.01)
    *B41M 5/00*     (2006.01)

(52) U.S. Cl.
    CPC ............... *B41J 3/4073* (2013.01); *B41J 11/20* (2013.01); *B41J 25/308* (2013.01); *B29D 2030/728* (2013.01); *B41M 5/0047* (2013.01); *B41M 5/0064* (2013.01); *B41M 5/0088* (2013.01)

(56) References Cited

FOREIGN PATENT DOCUMENTS

| | | |
|---|---|---|
| JP | 2006-111242 A | 4/2006 |
| JP | 2008-074329 A | 4/2008 |
| JP | 2010-125440 A | 6/2010 |
| JP | 2010-194401 A | 9/2010 |

OTHER PUBLICATIONS

International Search Report of PCT/JP2012/080672 dated Mar. 5, 2013.

* cited by examiner

TIRE PRINTING METHOD AND TIRE PRINTING APPARATUS

CROSS REFERENCE TO RELATED APPLICATIONS

This is a National Stage of International Application No. PCT/JP2012/080672 filed Nov. 28, 2012, claiming priority based on Japanese Patent Application No. 2011-275590 filed Dec. 16, 2011 and Japanese Patent Application No. 2012-096023 filed Apr. 19, 2012, the contents of all of which are incorporated herein by reference in their entirety.

BACKGROUND OF THE INVENTION

1. Field of the Invention

The present invention relates to a method for performing a printing on a side face of a tire.

2. Description of the Related Art

There are known technologies for performing printing on the side face of a tire using a print head. For example, in one method, printing on the side face of a tire is carried out by a plurality of print heads so disposed as to face the side face while the tire is rotated (see Patent Document 1, for instance). Or in another method, printing on the side face of a tire is done by rotating a print head so disposed as to face the side face in a circumferential direction around the rotation center axis of the tire (see Patent Document 2, for instance).

PRIOR ART DOCUMENT

Patent Document

Patent Document 1: Japanese Unexamined Patent Application Publication No. 2010-125440
Patent Document 2: Japanese Unexamined Patent Application Publication No. 2006-111242

SUMMARY OF THE INVENTION

Problem to be Solved by the Invention

When a printing on the side face of a tire is performed using a print head, the precision with which ink lands on the side face of the tire declines as the distance between the nozzles of the print head and the side face increases. On the other hand, the nozzles of the print head accidentally coming into contact with the side face of the tire may cause troubles such as adhesion of foreign matter to the nozzles or faulty ejection of ink because of air entry into the nozzles. Hence, it is essential that the profile (level differences) of the side face of the tire on which a printing is done be measured and an appropriate printing clearance be set between the nozzles of the print head and the side face of the tire. The profile of the side face of the tire for printing varies greatly with the tire size and between individual tires so that it is necessary to measure the surface profile of the side face of each tire before a printing is performed.

However, the profile of the side face of a tire for printing has conventionally been measured by a mechanical contact type measurement or by a measurement using a point detection type sensor. As a result, it was not possible to measure the detailed level differences of the side face with high precision and set a proper printing clearance. It may be possible, however, to measure the detailed level differences of the side face with high precision if the measurement is done at shorter intervals in the radial and circumferential directions of the side face of the tire. In this case, though, the measurement takes too much time, thus creating problems from a practical perspective.

The present invention provides a tire printing method which realizes highly precise printing by quickly and accurately measuring the profile of the side face of a tire on which the printing is performed and setting an appropriate distance between the print head and the side face of the tire (printing clearance).

Means for Solving the Problem

The present invention provides a method for performing a printing on a side face of a tire by discharging ink from nozzles of a print head so disposed as to face the side face of the tire. The method includes the steps of detecting side face information of the tire using a two-dimensional displacement measuring sensor disposed to face the side face of the tire and adjusting the distance between the print head and the side face of the tire by adjusting either the position of the print head or the inter-bead distance of the tire based on the side face information of the tire.

BEST MODE FOR CARRYING OUT THE INVENTION

First Embodiment

Figure 1:
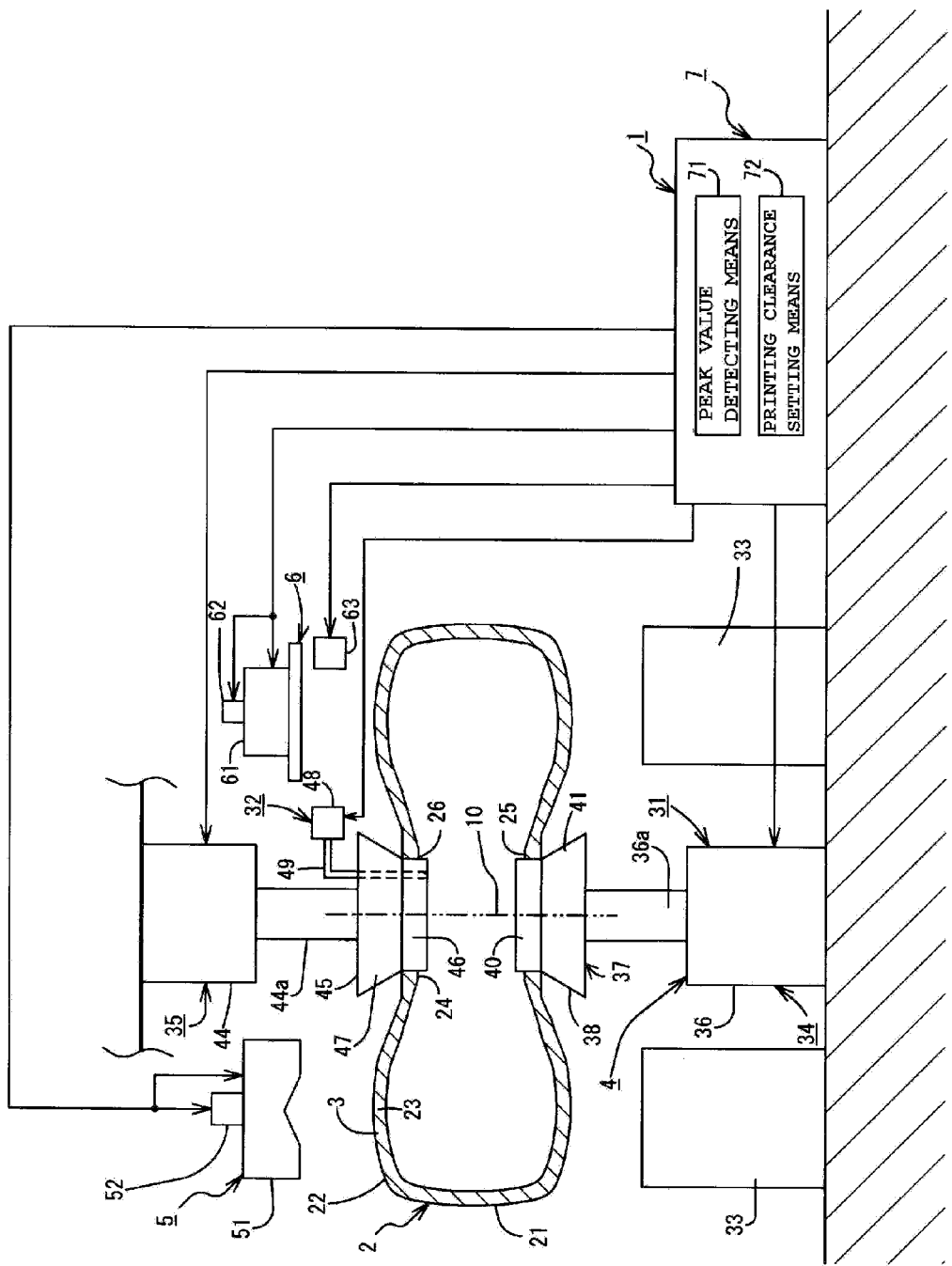
FIG. 1 is a diagram showing a tire printing apparatus.

A description is given of the structure of a tire printing apparatus with reference to FIG. 1.

The tire printing apparatus 1, which is an apparatus for performing printing on a side face 3 of a tire 2, includes a tire setting means 4, a measuring means 5, a printing means 6, and a control means 7.

The tire 2 is ring-shaped in appearance, and the following description is given on the assumption that the central line of the ring is the central axis line 10 of the tire 2.

The tire 2 includes a tread region 21, shoulder regions 22, sidewall regions 23, and bead regions 24. The tread region 21 is cylindrical in shape having the central axis line 10 of the tire 2 as its central axis line. The shoulder regions 22 are so disposed as to extend from the ends of the cylinder of the tread region 21. The sidewall regions 23 are so disposed as to extend from the respective shoulder regions 22 in the direction of the central axis line 10 of the tire 2. And the bead regions 24 are so disposed as to extend from the respective sidewall regions 23 in the direction of the central axis line 10 of the tire 2. In other words, the shoulder regions 22, the sidewall regions 23, and the bead regions 24 are the parts extending in the direction of the central axis line 10 of the tire 2 from the respective ends of the cylinder of the tread region 21. Therefore they constitute the ring-shaped part of the tire 2 having the central axis line 10 of the tire 2 as its center. The edges of the bead regions 24 closest to the central axis line 10 of the tire 2 are formed into toric edges having the central axis line 10 of the tire 2 as its center, and the circular holes framed by these toric edges of the bead regions 24 having the central axis line 10 of the tire 2 as their center function as rim fitting holes 25 and 26.

Note that the side face 3 of the tire 2 refers to the external surface of the shoulder region 22, sidewall region 23, and bead region 24.

The tire setting means 4 includes a tire rotating unit 31 and an air injection unit 32.

The tire rotating unit 31 is a unit for rotating a tire 2 on its side with its central axis line 10 held vertical or substantially vertical around the central axis line 10 of the tire 2 as its rotation center.

The tire rotating unit 31 includes a tire setting section 33, a lower lifting/lowering rotation drive mechanism 34, and an upper lifting/lowering drive mechanism 35.

The tire setting section 33 is constituted by a belt conveyance surface of a belt conveyor unit which receives a tire 2 having been conveyed and stopped on its side by a not-shown roller conveyor or by a holding pedestal on which the tire 2 is set on its side, for instance.

The lower lifting/lowering rotation drive mechanism 34 includes a lower lifting/lowering unit 36 and a rotating unit 37.

The lower lifting/lowering unit 36 is structured by a lifting/lowering mechanism using a hydraulic jack mechanism, a lifting/lowering mechanism using an electric motor, or a lifting/lowering mechanism using a ball screw and linear motion guide mechanism, for instance.

The rotating unit 37 includes a rotating body 38 for rotating the tire 2 around the central axis line of the tire 2 as the rotation center and a not-shown rotation drive mechanism for rotating the rotating body 38.

The rotating body 38, which is formed by a columnar body attached via a not-shown base to the upper end portion of a vertical motion shaft 36a of the lower lifting/lowering unit 36, is rotatable with the central axis line 10 of the tire 2 as the center. The columnar body 38 constituting the rotating body 38, when it is fitted from below into a lower rim fitting hole 25 located in the underside of the tire 2 set on its side on the tire setting section 33, not only keeps the lower rim fitting hole 25 airtight, but also communicates a rotative force to the tire 2.

The columnar body 38 constituting the rotating body 38 includes an upper cylindrical part 40 and a lower truncated cone part 41. The upper cylindrical part 40 is formed into a true cylinder, whereas the lower truncated cone part 41 is formed into a truncated cone with a conic surface whose peripheral diameter is gradually larger from the upper end thereof, bordering with the lower end periphery of the upper cylindrical part 40, to the lower end thereof.

The rotation drive mechanism is provided with a not-shown rotation drive source and rotation transmission mechanism.

The rotation drive source is constituted by a motor, for instance, and the rotation transmission mechanism by a gear transmission mechanism, for instance. The gear transmission mechanism may, for example, have an output gear attached to the output shaft of the motor and a driven gear to mesh with the output gear and so formed on the rotating body 38 as to rotate the rotating body 38 with its rotation center at the central axis line. Thus the gear transmission mechanism may rotate the rotating body 38 by transmitting the rotative force of the motor to the rotating body 38 via the output gear and the driven gear.

The above-mentioned not-shown base has, for instance, a holding part to which the upper end of the vertical motion shaft 36a of the lower lifting/lowering unit 36 is secured, in the lower part thereof, and a not-shown rotation center shaft rotatably supporting the rotating body 38, in the upper part thereof. That is, the rotating body 38 is installed rotatably around the central axis line 10 as the rotation center, with the rotation center shaft of the base fitted into the rotation center hole provided in the rotating body 38. And the above-mentioned motor is secured to the not-shown base, and the driven gear whose rotation center is the central axis line 10 of the tire 2 is formed on the outer periphery of the not-shown center shaft part which surrounds the rotation center hole of the rotating body 38. Then the output gear provided on the output shaft of the motor and the driven gear provided on the rotating body 38 are engaged with each other. As a result, the rotating body 38 rotates around the central axis line 10 as the rotation center with the rotative force of the motor communicated to the rotating body 38 through the output gear and the driven gear.

The upper lifting/lowering drive mechanism 35 includes an upper lifting/lowering unit 44 and a rotating body 45.

The upper lifting/lowering unit 44 consists of a lifting/lowering mechanism using a hydraulic jack mechanism, a lifting/lowering mechanism using an electric motor, or a lifting/lowering mechanism using a ball screw and linear motion guide, for instance.

The rotating body 45 is formed as a columnar body attached to the lower end of the vertical motion shaft 44a of the upper lifting/lowering unit 44 rotatably around the central axis line of the vertical motion shaft 44a as the rotation center. The columnar body constituting the rotating body 45 is placed such that the central axis line of the columnar body is aligned with the central axis line of the vertical motion shaft 44a. Thus, the columnar body constituting the rotating body 45 not only fits from above into the upper rim fitting hole 26 located in the upper part of the tire 2 placed on its side, thus stopping up the upper rim fitting hole 26 in an airtight manner, but also receives a rotative force from the tire 2, thus rotating around the central axis line 10 as the rotation center.

The columnar body constituting the rotating body 45 is made up of a lower cylindrical part 46 and an upper truncated cone part 47. The lower cylindrical part 46 is formed into a true cylinder, whereas the upper truncated cone part 47 is formed into a truncated cone with a conic surface whose peripheral diameter is gradually larger from the lower end thereof, bordering with the upper end periphery of the lower cylindrical part 46, to the upper end thereof.

The upper cylindrical part 40 of the rotating body 38 and the lower cylindrical part 46 of the rotating body 45 are formed with a diameter corresponding to the minimum diameter, for instance, of the size of the rim fitting holes of the tire 2 for printing. Air is injected into the tire 2 with the upper cylindrical part 40 of the rotating body 38 and the lower cylindrical part 46 of the rotating body 45 squeezed into the tire 2 as they are fitted into the rim fitting holes 25 and 26, respectively. As a result, airtightness is ensured with the rim of the lower rim fitting hole 25 in close contact with the outer periphery of the lower truncated cone part 41 and the rim of the upper rim fitting hole 26 in close contact with the outer periphery of the upper truncated cone part 47. In this state, the rotative force of the rotating body 38 is communicated to the tire 2, and the rotative force of the tire 2 is communicated to the rotating body 45, which will rotate accordingly.

The air injection unit 32 includes an air supply source 48 and an air supply channel 49. The air supply source 48 is constituted by a compressor, for instance. The air supply channel 49 is made up of a communicating channel formed in the rotating body 38/45 communicating the lower face of the lower cylindrical part 46 with the upper face of the upper truncated cone part 47 and a communicating tube connecting the air outlet of the compressor to the inlet of the communicating channel opening on the upper face of the upper truncated cone part 47.

The rotating body 45 comes with the upper truncated cone part 47 such that, with air injected into the tire 2, the rim of the upper rim fitting hole 26 rises upward in closer contact with the outer periphery of the upper truncated cone part 47, thus ensuring airtightness there. As a result, with the rotating body 45 moved upward, the side face 3, which is the upper side of the tire 2 for printing, becomes flattened with smaller height difference of the side face 3.

The measuring means 5 includes a two-dimensional displacement measuring sensor 51 and a sensor moving mechanism 52.

Figure 2:
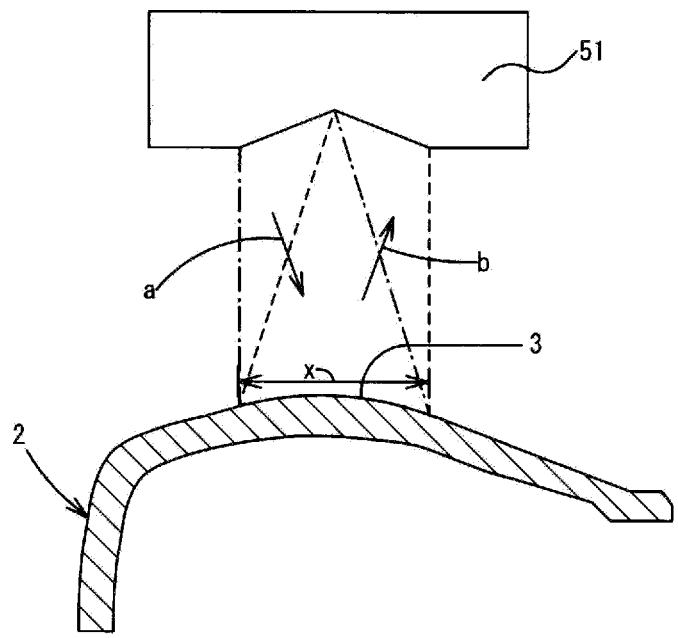
FIG. 2 is a schematic depiction of an example of measurement using a two-dimensional displacement measuring sensor.

The two-dimensional displacement measuring sensor 51 (hereinafter referred to as "displacement sensor") is disposed in a position above and facing the upper side face 3 of the tire 2 set in a manner ready for printing. The displacement sensor 51 emits a laser beam a at a predetermined range X on an extension line extending in a radial direction on the upper side face 3 of the tire 2 and receives a laser beam b reflected from the side face 3, as shown in FIG. 2 for instance. The displacement sensor 51 thus measures the surface profile of the side face 3 along the predetermined range X having been exposed to the laser beam a. In other words, the displacement sensor 51 is a measuring device for simultaneously acquiring position information and height information on the predetermined range X on the extension line extending in a radial direction on the upper side face 3 of the tire 2.

The sensor moving mechanism 52 is a mechanism for moving the displacement sensor 51 in the vertical direction along the central axis line 10 of the tire 2 (hereinafter referred to as the "axial direction" of the tire) and in the direction along the diameter line of the tire 2 perpendicular to the central axis line 10 of the tire 2 (hereinafter referred to as the "radial direction" of the tire).

The printing means 6 includes a print head 61, a print head moving mechanism 62, and an ink drying means 63.

The print head 61 is, for instance, an inkjet print head. The print heads 61 to be prepared are one for each of cyan, magenta, yellow, white, and black, for instance.

The print heads 61 are each of such design that the ink supplied from a not-shown ink supply mechanism to a not-shown ink chamber communicating to the openings of nozzles 61b is discharged from the openings of the nozzles 61b. For example, the arrangement is such that the ink is ejected from the openings of the nozzles 61b as the pressure to the ink in the ink chamber is changed by changing the volume of the ink chamber by the expansion and contraction of a not-shown piezoelectric device in response to drive signals (see FIG. 3).

Figure 4:
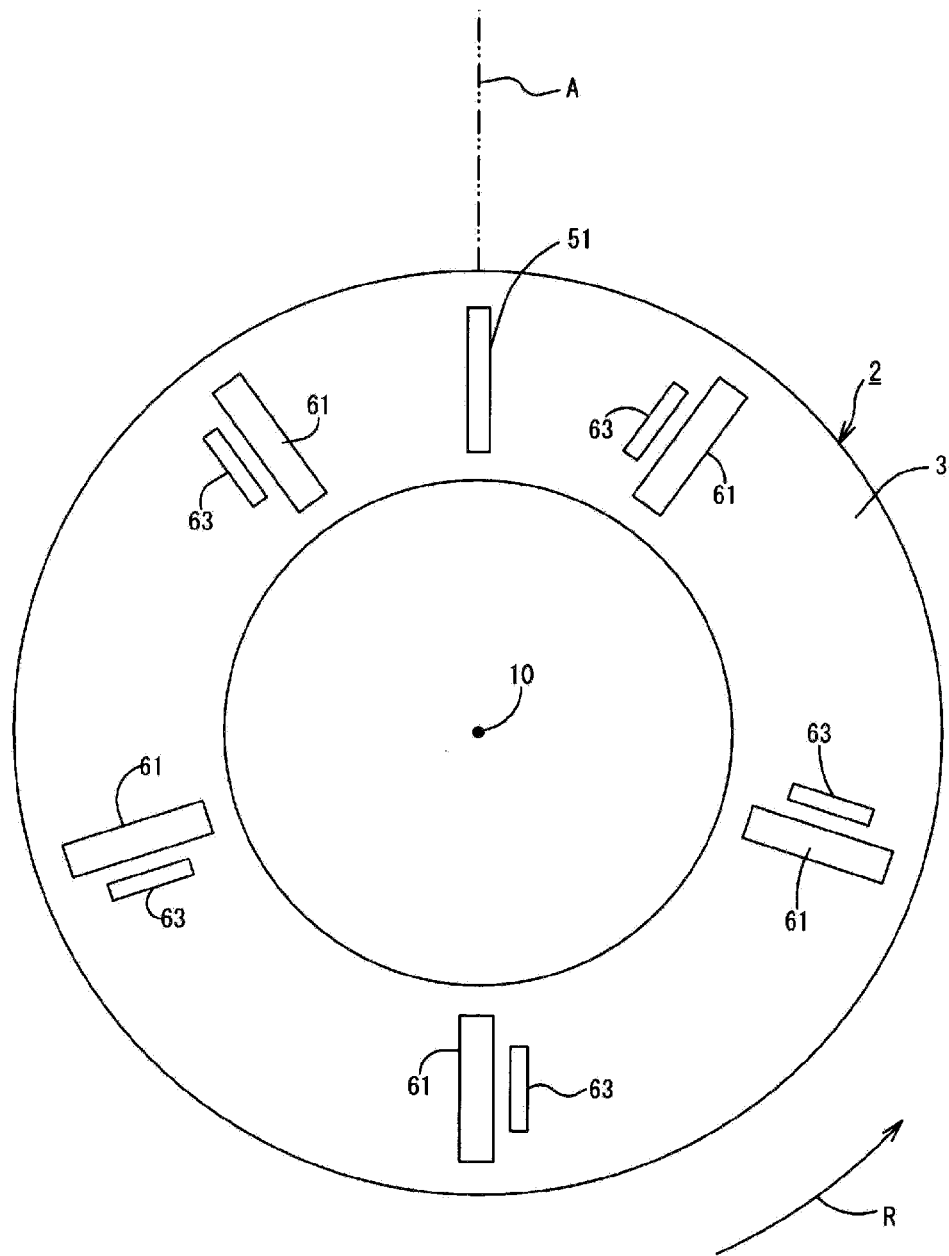
FIG. 4 is a diagram showing an arrangement of a two-dimensional displacement measuring sensor, print heads, and ultraviolet lamps.
Figure 5A:
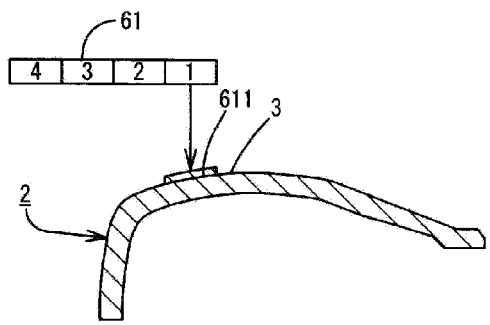
FIGS. 5(a)-5(g) are illustrations showing a pass printing on the side face of a tire.
Figure 5B:
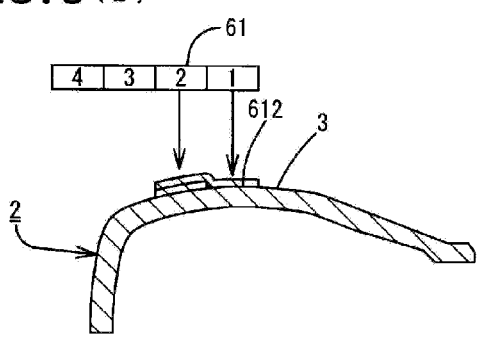
Figure 5C:
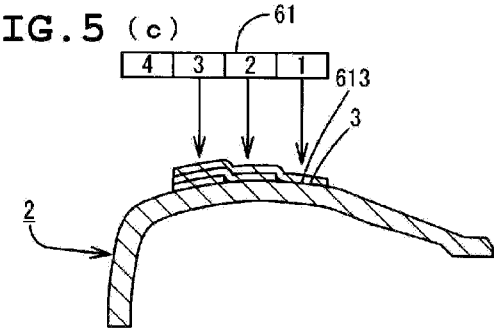
Figure 5D:
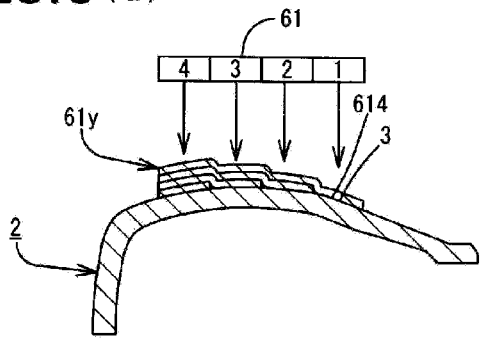
Figure 5E:
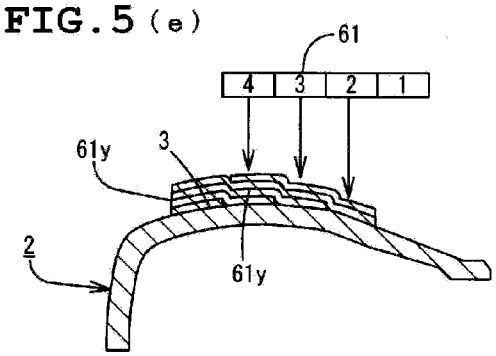
Figure 5F:
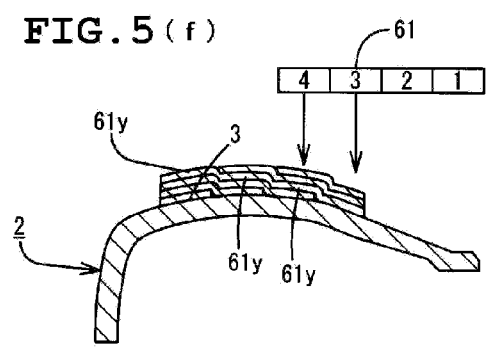
Figure 5G:
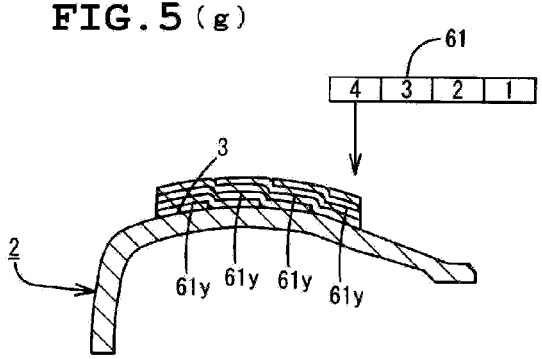

The ink drying means 63 is, for example, an ultraviolet lamp (hereinafter referred to as "UV lamp"). The UV lamp is disposed right behind each of the print heads 61 in the rotation direction R of the tire 2 as shown in FIG. 4, for instance.

The sensor moving mechanism 52 is a mechanism for moving the displacement sensor 51 in the axial direction and in the radial direction of the tire 2. The arrangement, for instance, incorporates a direct-acting moving mechanism consisting of a ball screw and an LM guide which moves the member holding the displacement sensor 51. And the travel distances in the axial direction and in the radial direction of the tire 2 are controlled by the servo motors. It is to be noted that the print head moving mechanism 62 and the not-shown ink drying means moving mechanism are also constructed in the same way as the sensor moving mechanism 52.

The control means 7 includes a tire setting control means, a measurement control means, and a printing control means, as well as a peak value detecting means 71 and a printing clearance setting means 72.

The tire setting control means controls the vertical motion of the vertical motion shaft 36a of the lower lifting/lowering rotation drive mechanism 34, the rotating motion of the rotating body 38, the vertical motion of the vertical motion shaft 44a of the upper lifting/lowering drive mechanism 35, and the air supply by the on-off operation of the air supply source 48.

The measurement control means controls the on-off operation of the displacement sensor 51 and the operation of the sensor moving mechanism 52. And the measurement control means measures the surface profile of the side face 3 along the predetermined range X positioned below the displacement sensor 51 a plurality of times by operating the displacement sensor 51 a plurality of times during the 360 degrees of rotation (i.e., a single rotation) of the tire 2 from the initial position A of FIG. 4.

The printing control means controls the printing operation of the print head 61 and the operations of the print head moving mechanism 62 and the ink drying means 63.

The peak value detecting means 71 detects the peak value (height information at position P (see FIG. 4) where the level of the upper side face 3 is the highest) from the results of a plurality of measurements done by the displacement sensor 51 during the single rotation of the tire 2.

Figure 3:
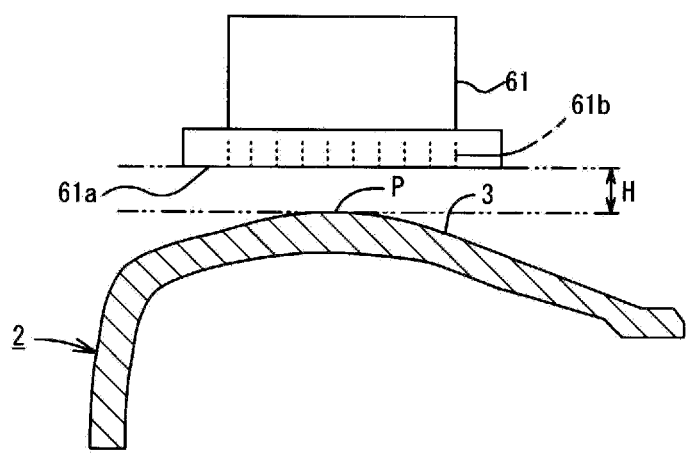
FIG. 3 is a schematic depiction showing a relationship between the side face of a tire and a print head.

The printing clearance setting means 72 inputs the peak value of the side face 3 in the measurement of the level differences by the displacement sensor 51 and sets a predetermined printing clearance H between the nozzle face 61a of each print head 61 and the side face 3 (distance between the print head 61 and the side face 3 of the tire 2) such that the nozzle face 61a is located at a position a predetermined value apart from the peak value (see FIG. 3). This printing clearance H is set, for instance, within a range of 2 mm to 8 mm and, more preferably, within a range of 2 mm to 5 mm.

After a printing is done on the side face 3 by driving the print head 61, the rotation of the tire 2 is controlled so that the printed part comes under the UV lamp. As a result, the ink of the printed part can be dried immediately after printing, and various colors can be printed before the tire makes a full circle.

A description is given of a printing method of the first embodiment.

After a tire 2 is set on its side on the tire setting section 33, the tire setting control means moves the vertical motion shaft 36a upward by controlling the lower lifting/lowering rotation drive mechanism 34. Consequently, the upper cylindrical part 40 of the rotating body 38 is squeezed into the tire 2 as it is fitted into the lower rim fitting hole 25, and the tire 2 moves upward from the tire setting section 33. Further, the vertical motion shaft 44a of the upper lifting/lowering drive mechanism 35 is moved downward. As a result, the lower cylindrical part 46 of the rotating body 45 is squeezed into the tire 2 as it is fitted into the upper rim fitting hole 26. Thus, airtightness is ensured with the rim of the lower rim fitting hole 25 in close contact with the outer periphery of the lower truncated cone part 41 of the rotating body 38 and the rim of the upper rim fitting hole 26 in close contact with the outer periphery of the upper truncated cone part 47 of the rotating body 45.

Now air is injected into the tire 2 in the airtight state by driving the air supply source 48 of the air injection unit 32. At this time, the airtightness is ensured with the rim of the upper rim fitting hole 26 moved as far up as practicable in close contact with the outer periphery of the upper truncated cone part 47. At the same time, the rotating body 45 is moved upward, so that the upper side face 3 of the tire 2 for printing becomes as close to a flat plane as practicable with a smallest possible height difference of the upper side face 3.

Next, the measurement control means measures the surface profile of the side face 3 along the predetermined range X positioned below the displacement sensor 51 a plurality of times by operating the displacement sensor 51 a plurality of times during a single rotation of the tire 2 from the initial position A. That is, the measurement control means obtains the position information and height information on the side face 3 a plurality of times during a single rotation of the tire 2. It goes without saying that the shorter the interval between the measurements, the higher the accuracy of the information will be.

The peak value detecting means 71 extracts the peak height (peak value) of the side face 3 from the results of a plurality of measurements obtained during a single rotation of the tire 2 with the central axis line 10 as the rotation center. And the printing clearance setting means 72 sets a predetermined printing clearance H between the nozzle face 61a of each print head 61 and the side face 3 by controlling the sensor moving mechanism 52 such that the nozzle face 61a is located at a position a predetermined value apart from the peak height.

The printing control means performs a printing on the side face 3 by driving the print head 61 while maintaining the predetermined printing clearance H set as above.

It is to be noted that when there has been a change in the size of the tire 2, the positions of the displacement sensor 51, the print heads 61, and the UV lamps in the radial and axial directions of the tire 2 must be adjusted by controlling the sensor moving mechanism 52, the print head moving mechanism 62, and the ink drying means moving mechanism.

That is, the tire printing method according to the first embodiment includes the steps of acquiring side face information by simultaneously acquiring position information and height information on the side face 3 using a displacement sensor 51 so disposed as to face the side face 3 of the tire 2, setting a printing clearance H between the nozzles 61b of the print head 61 so disposed as to face the side face 3 of the tire 2 and the side face 3 of the tire 2 based on the height information acquired in the step of acquiring side face information, and performing a printing on the side face 3 of the tire 2 by discharging ink from the nozzles 61b of the print head 61 so positioned as to face the side face 3 of the tire 2 at the printing clearance H set in the step of setting the printing clearance. Thus, the position information and height information on the side face 3 can be obtained by operating the displacement sensor 51 every time the tire 2 is rotated by a predetermined angle. Hence, the profile of the side face 3 of the tire 2 for printing can be measured in a short time and with great precision, and the printing clearance H can be set properly. As a result, printing can be performed on the side face 3 of the tire 2 with a high degree of accuracy.

It should be noted that since the profile measurement is made repeatedly during a single rotation of the tire 2 in the first embodiment, the number of measurements during the single rotation of the tire 2 is determined by the sampling interval of the displacement sensor 51 (measurement interval of the displacement sensor 51 along the tire periphery).

This sampling interval is determined by the sampling period (ms) of the displacement sensor 51, the radial dimension (mm) of the tire for profile measurement, and the circumferential speed (rpm) of the rotating tire. For example, the sampling interval is determined as follows:

When the maximum diameter of the tire 2 for profile measurement is 750 mm and the sampling period 15 ms, the sampling interval is set at 5.9 mm (angular interval of measurement: 0.9 deg) for a circumferential speed of 10.0 rpm. And the sampling interval is set at 4.4 mm (angular interval of measurement: 0.7 deg) for a circumferential speed of 7.5 rpm and at 2.9 mm (angular interval of measurement: 0.5 deg) for a circumferential speed of 5.0 rpm.

That is, in the first embodiment, the sampling interval is set at 6.0 mm or less (angular interval of measurement: 1 deg or less). As a result, the profile of the side face 3 of the tire 2 for printing can be measured in a short time and with great precision, and the printing clearance H can be set properly. Therefore, printing can be performed on the side face 3 of the tire 2 with a high degree of accuracy.

Second Embodiment

In the first embodiment, the clearance between the nozzle face 61a of the print head 61 and the side face 3 is set to a fixed printing clearance H. However, the arrangement may be such that the printing clearance H for each of the print heads 61 is set to an optimum clearance sequentially as the tire 2 is rotated. In this case, the profile measurement values of the side face 3 obtained whenever the tire 2 is rotated by a predetermined angle from the initial position A are associated with the information on the angle of rotation from the initial position A before they are stored in the storage unit of the control means 7. At the same time, the angle of rotation of the tire 2, rotated in the R direction, is stored when the position of the side face 3 of the tire 2 having been positioned at the initial position A comes to the position under each of the print heads 61. Then, whenever the tire 2 is rotated by a predetermined angle from the initial position A, the printing clearance H between the nozzle face 61a of each of the print heads 61 and the side face 3 is set based on the peak value of the profile measurement values of the side face 3 which will come to the position under each of the print heads 61. This will realize a printing with greater accuracy.

That is, in the first embodiment, the printing clearance H is set based on the peak value of the highest level of the surface profile in the entirety of the side face 3 of the tire 2. Therefore, when there is a big difference between the peak value of the lowest level of the surface profile in the entirety of the side face 3 of the tire 2 and the highest peak value, there may be cases where the ink landing accuracy is lost in parts with lower peak values due to greater distances from the nozzle face 61a of the print head 61. In the second embodiment, however, the printing clearance H is so adjusted as to be constant every time the tire 2 is rotated. Therefore, the printing clearance H can be always set properly, thereby assuring highly accurate printing on the side face 3 of the tire 2.

Third Embodiment

When a printing on the side face 3 of the tire 2 is done by moving the print head 61 in the radial direction of the tire 2, the printing clearance H may be set according to the height information on the side face 3 corresponding to the radial position of the print head 61. Then the printing clearance H can be always kept constant when printing on the side face 3 of the tire 2 is done by moving the print head 61 in the radial direction of the tire 2. Thus, the printing clearance H can be always set properly, thereby assuring highly accurate printing on the side face 3 of the tire 2.

Fourth Embodiment

A plurality of nozzles 61b disposed in the nozzle face 61a of the print head 61 may be divided into a plurality of nozzle groups, and each nozzle group may be allowed to discharge ink independently of each other for printing. In this case, a plurality of nozzle groups perform a printing operation in the same region on the side face 3. For example, as shown in FIG. 5, four layers of printing (4-pass printing) can be carried out by performing a printing with four nozzle groups 1 to 4 in the same region on the side face 3.

As shown in FIG. 5, a plurality of nozzles disposed in the nozzle face 61a of the print head 61 are divided into a plurality of nozzle groups 1 to 4. Firstly, as shown in FIG. 5A, a printing is done by the nozzle group 1 only in the first region 611 on the side face 3. Next, as shown in FIG. 5B, the nozzle group 1 is moved to a position above the second region 612, which is adjacent to the first region 611 on the side face 3, and the nozzle group 1 does a printing in the second region 612. At the same time, the nozzle group 2, which is adjacent to the nozzle group 1, performs a printing in the first region 611. As a result, two printing layers are formed in the first region 611. Next, as shown in FIG. 5C, the nozzle group 1 is moved to a position above the third region 613, which is adjacent to the second region 612 on the side face 3. There the nozzle group 1 does a printing in the third region 613, and at the same time, the nozzle group 2 does a printing in the second region 612, and the nozzle group 3, which is adjacent to the nozzle group 2, performs a printing in the first region 611. As a result, three printing layers are formed in the first region 611. Further, as shown in FIG. 5D, the nozzle group 1 is moved to a position above the fourth region 614, which is adjacent to the third region 612 on the side face 3. There the nozzle group 1 does a printing in the fourth region 614, and the nozzle group 2 does a printing in the third region 613. At the same time, the nozzle group 3 does a printing in the second region 612, and the nozzle group 4, which is adjacent to the nozzle group 3, performs a printing in the first region 611. As a result, four printing layers are formed in the first region 611, three printing layers in the second region 612, and two printing layers in the third region 613. Next, as shown in FIG. 5E, the nozzle group 2 is moved to a position above the fourth region 614, the nozzle group 3 to a position above the third region 613, and the nozzle group 4 to a position above the second region 612 for a printing operation. As a result, four printing layers 61y are formed in the second region 612, three printing layers in the third region 613, and two printing layers in the fourth region 614. Further, as shown in FIG. 5F, the nozzle group 3 is moved to a position above the fourth region 614, and the nozzle group 4 to a position above the third region 613 for a printing operation. As a result, four printing layers 61y are formed in the second region 612, and three printing layers in the fourth region 614. Finally, as shown in FIG. 5G, the nozzle group 4 is moved to a position above the fourth region 614 for a printing operation. As a result, four printing layers 61y are formed in the fourth region 614. In this manner, four printing layers 61y are formed in the first region 611 to the fourth region 614. Thus performing printing a plurality of times by a plurality of nozzle groups 1 to 4 in the same region on the side face 3 can make up for faulty discharge of ink from the nozzles 61b, thereby making it possible to avoid a drop in printing quality, such as lateral streaks in the printed image.

Fifth Embodiment

In the first embodiment, an example of measuring the uneven level (profile) of the side face 3 by rotating the tire 2 has been described. However, the arrangement may be such that the position information and height information on the side face 3 at every predetermined angular position of the tire 2 with the central axis line 10 as the rotation center are measured by moving the displacement sensor 51 in the circumferential direction along the side face 3.

Sixth Embodiment

In the first embodiment, an example of performing printing by rotating the tire 2 has been described. However, the arrangement may be such that the printing is done with the print head 61 moved in the circumferential direction along the side face 3. Then the unit for rotating the tire 2 can be eliminated.

Seventh Embodiment

When the print head 61 is moved along the side face 3 in the circumferential direction, the printing clearance H may be set based on the rotation angle information of the tire 2 or the movement position information of the displacement sensor 51 and the peak value of the height information on the side face 3. In this case, too, the printing clearance H can be always kept constant for every movement of the print head 61 by a predetermined angle in the circumferential direction along the side face 3. Therefore, the printing clearance H can be always set properly, thereby assuring highly accurate printing on the side face 3 of the tire 2.

Eighth Embodiment

Hereinbelow, a description will be given of an eighth embodiment with reference to FIGS. 6 to 11.

A tire printing apparatus 1A includes a tire position setting means 103 for setting the position of a tire 2 on its side for printing and a printing means 6 for performing a printing on the upper side face 3 of the tire 2.

Figure 7:
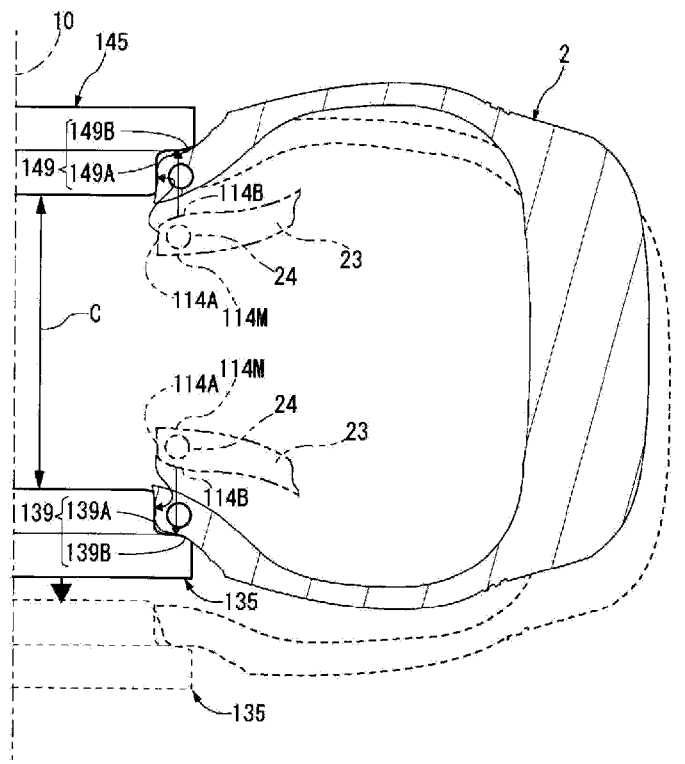
FIG. 7 is a conceptual diagram showing the supporting of a tire by upper and lower rim bodies.

As shown in FIG. 7, the end portion of the bead region 24 on each side of the tire 2 consists of an inner peripheral portion 24A located closer to the rotation center axis A of the tire 2, an outer surface portion 24B on the axially outer side, and an inner surface portion 24M on the axially inner side.

The tire 2 for printing is carried on its side by a conveying means 105 to a printing position where the tire position setting means 103 and the printing means 6 are disposed in their respective positions. The conveying means 105, which is constituted by a pair of roller conveyors on the right and left each extending in the conveyance direction (from the rear to the front of the sheet), conveys the tire 2 on its side placed on both the conveyors. Also, the conveying means 105 carries the tire 2 to the printing position with the rotation center axis 10 of the tire 2 aligned with the width center of the pair of roller conveyors.

The tire position setting means 103 rotates the tire 2 having been brought here at the conveyance stop position. The tire position setting means 103 is constructed of a lower support mechanism 131 that supports from below a lower rim body 135 as a holding means to hold one bead region 24 of the tire 2 and an upper support mechanism 132 that supports from above an upper rim body 145 as a holding means to hold the other bead region 24 of the tire 2. The tire 2 is supported rotatably by the lower rim body 135 and the upper rim body 145 in a manner of being sandwiched from below and above such that the upper and lower openings of the tire 2 are stopped up. The lower support mechanism 131 includes a lifting/lowering means 133, a rotating means 134, a rotating shaft 137, and a lower rim body 135.

The lifting/lowering means 133, which is, for instance, constituted by a hydraulic jack mechanism, lifts and lowers a cylinder 133a. The lifting/lowering means 133 may also be constituted by a lifting/lowering mechanism using an electric motor or a lifting/lowering mechanism using a ball screw and a linear motion guide mechanism. The lifting/lowering means 133 is connected to a control unit 100 to be discussed later, and the lifting and lowering operations of the cylinder 133a are controlled by the signals outputted from the control unit 100.

The rotating means 134, which is made up of a rotary motor 136, a gear 136A, and a spur gear 137A, rotates the rotating shaft 137 via the gear 136A and the spur gear 137A by the rotative force of the motor 136. The rotary motor 136, which is connected to the control unit 100 to be discussed later, runs in response to the signals outputted from the control unit 100.

The lower rim body 135 fits from below into the opening surrounded by the bead region 24, that is, the end of the sidewall region 23, on the lower side of the tire 2 brought on its side by the conveying means 105, thereby stopping up the opening. Thus, the lower rim body 135 supports the tire 2 from below, aligning the central axis thereof with the rotation center axis A of the tire 2, and communicates the rotative force to the tire 2. The lower rim body 135 is trapezoidally shaped in cross section. The lower rim body 135 is secured to the rotating shaft 137, with the smaller diameter face 135a thereof up and the larger diameter face 135b thereof down, such that its central axis is aligned with the axis center of the rotating shaft 137. The outer periphery of the lower rim body 135 is formed in a stepped engaging portion 139 between the larger diameter face 135b and the smaller diameter face 135a.

The engaging portion 139 has an inner periphery engaging surface 139A coming into contact with the inner peripheral portion 24A of the bead region 24 and a side engaging surface 139B coming into contact with the outer surface portion 24B.

The inner periphery engaging surface 139A of the engaging portion 139 is formed with a taper whose diameter reduces from the downside to the upside. Also, the side engaging surface 139B is formed to extend perpendicularly to the central axis of the lower rim body 135.

Figure 6:
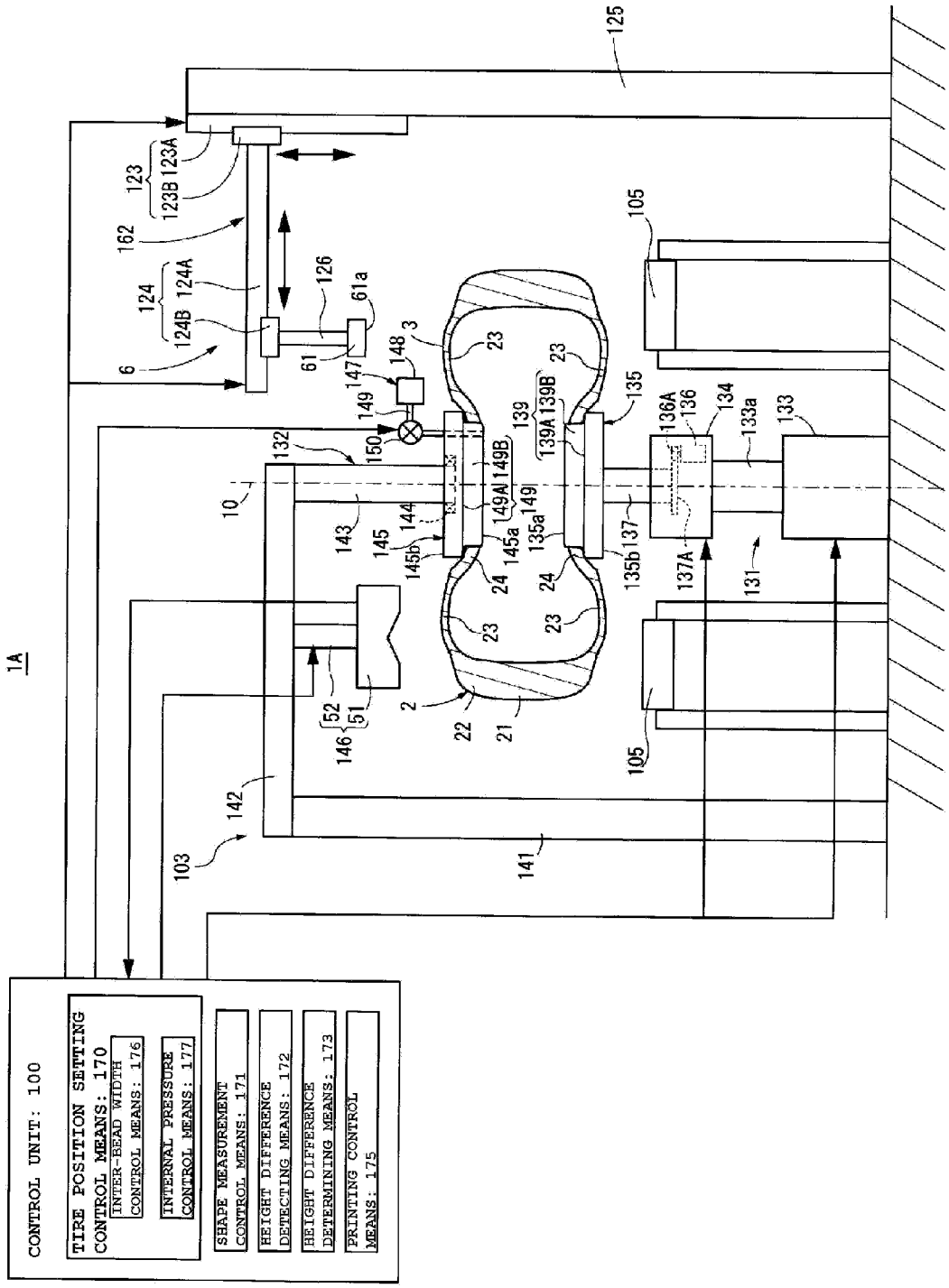
FIG. 6 is a diagram showing a tire printing apparatus.

In FIG. 6, the upper support mechanism 132 includes an upper rim body 145 as the second rim body for holding the tire 2 in cooperation with the lower rim body 135 and a shape measuring means 146 for measuring the shape (profile) of the side face 3 of the tire 2 held by the lower and upper rim bodies 135 and 145. The upper rim body 145 is attached to an end of a horizontal frame 142. The horizontal frame 142 is attached to a frame 141 at its rear end and has a vertically extending support shaft 143 at its end. The support shaft 143 is secured to the end of the horizontal frame 142 in such a manner that its shaft center is aligned with the central axis of the lower rim body 135 of the lower support mechanism 131.

The upper rim body 145 is formed symmetrically to the lower rim body 135 below, and thus has its outer periphery shaped in a stepped inverted trapezoid in cross section in a similar manner to the lower rim body 135. The upper rim body 145, with its smaller diameter face 145a down, has its larger diameter face 145b attached rotatably to the lower end of the support shaft 143, via a bearing 144 or the like, such that its central axis is aligned with the shaft center of the support shaft 143, that is, with the rotation center axis 10 of the tire 2. The outer periphery of the upper rim body 145 has a stepped engaging portion 149 between the larger diameter face 145b and the smaller diameter face 145a thereof. That is, the engaging portion 149 has an inner periphery engaging surface 149A coming into contact with the inner peripheral portion 24A of the bead region 24 and a side engaging surface 149B at right angles with the inner periphery engaging surface 149A and coming into contact with the outer surface portion 24B.

Thus, when the lower rim body 135 is raised by driving the lifting/lowering means 133 of the lower support mechanism 131, the engaging portion 139 of the lower rim body 135 is engaged with the opening surrounded by the bead region 24, that is, the end of the sidewall region 23, on the lower side of the tire 2 of a given axial size. Then the tire 2, together with the lower rim body 135, is raised until the engaging portion 149 of the upper rim body 145 is engaged with the opening surrounded by the bead region 24 on the upper side of the tire 2. In this manner, the tire 2 is held sandwiched between the lower rim body 135 and the upper rim body 145.

Also, connected to the upper rim body 145 is an air injection unit 147 for injecting air into the tire 2 held by the lower and upper rim bodies 135 and 145. The air injection unit 147 includes an air supply source 148, an air supply channel 149, and a valve 150. The air supply source 148 is constituted by a compressor, for instance. The air supply channel 149 is, for instance, constituted by a communicating conduit connecting the opening in the larger diameter face 145b of an air conduit, which communicates from the larger diameter face 145b to the smaller diameter face 145a of the upper rim body 145, to the air outlet of the compressor.

The valve 150, which is disposed on the air supply channel 149, is an electrically-operated valve capable of controlling the air pressure of the air injected into the tire 2 in response to the signal outputted from the control unit 100 to be discussed later. Hence, the air adjusted to a predetermined pressure by the operation of the valve 150 controlled by the control unit 100 is injected into the tire 2.

With the air injected into the tire 2 at the predetermined pressure, the inner peripheral portions 24A of the bead regions 24 of the tire 2 are pushed along the inner periphery engaging surfaces 139A and 149A of the lower and upper rim bodies 135 and 135 toward the side engaging surfaces 139B and 149B. As a result, airtightness is created with the outer surface portions 24B of the bead regions 24 coming into close contact with the side engaging surfaces 139B and 149B. Accordingly, the side face 3, which is the upper side of the tire 2 on which printing is done, becomes flattened with smaller height difference of the upper side face 3.

The air pressure to be applied to the tire 2 is set within a range of not more than the internal pressure specified as an optimum value for the structure and use of the tire by JATMA (Japan Automobile Tire Manufacturers Association) to a half or more of the specified internal pressure. By injecting air into the tire 2 at a pressure within the above-mentioned range, the time required to inject air into and release it from the tire 2 can be shortened, thus improving the productivity related to the tire printing. At the same time, printing accuracy can be secured with tension given to the side face 3 of the tire 2. If, however, the air is injected at a pressure outside the above-cited range, for example, at less than half of the specified internal pressure, then it may be possible that an optimal tension cannot be given to the side face 3 of the tire 2 and there may be a loss of centering accuracy in the alignment of the rotation center axis A of the tire 2 with the central axis of the lower and upper rim bodies 135 and 145.

The shape measuring means 146 includes the above-mentioned two-dimensional displacement measuring sensor 51 and the above-mentioned sensor moving mechanism 52.

Figure 8:
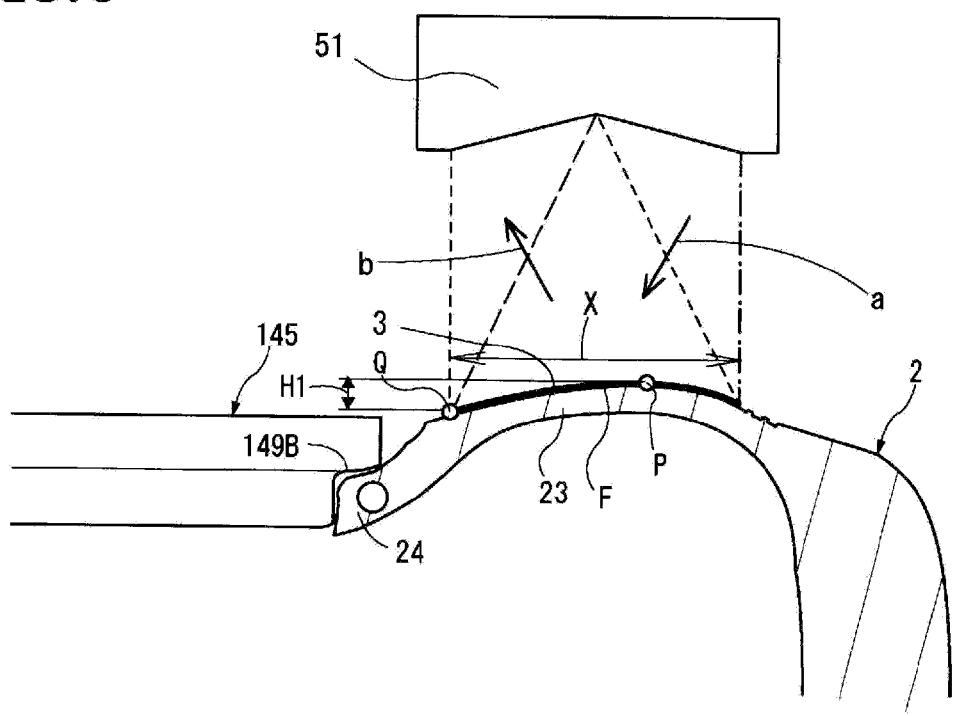
FIG. 8 is a schematic depiction showing an example of measurement of a surface profile using a two-dimensional displacement measuring sensor.

The two-dimensional displacement measuring sensor 51 as a shape measuring device obtains a surface profile F of the side face 3 along a predetermined range X on the tire surface exposed to the laser beam a as shown in FIG. 8, for instance. The predetermined range X is set as the range covering the whole extent of the sidewall region 23 or the range overlapping the printing range on the side face 3. Even when there is a change in tire size, the predetermined range X can be set in a similar manner for each tire so as to acquire the surface profile F of the side face 3 with the sensor moving mechanism 52 moving the displacement sensor 51 in the vertical and radial directions relative to the side face 3 of the tire 2.

The printing means 6 includes the above-described print head 61 and a print head moving mechanism 162.

The print head moving mechanism 162 is constructed of a height-direction moving mechanism 123 for adjusting the position of the print head 61 relative to the side face 3 of the tire 2 and a radial-direction moving mechanism 124 for moving the print head 61 in the radial direction of the tire 2.

The height-direction moving mechanism 123 is attached to an upper end position of a support post 125 which is installed upright to a height higher than the upper side face 3 of the tire 2 having been carried to the printing position on the conveying means 105. The height-direction moving mechanism 123 is, for instance, a linear guide consisting of a rail 123A and a slider 123B. The rail 123A is attached in a vertical orientation to an upper end position of the support post 125, and the slider 123B is moved in the extension direction of the rail 123A driven by a not-shown drive means.

As with the height-direction moving mechanism 123, a linear guide consisting of a rail 124A and a slider 124B that moves on the rail 124A is used as the radial-direction moving mechanism 124. The radial-direction moving mechanism 124 has one end thereof secured to the slider 123B of the height-direction moving mechanism 123 and the other end thereof disposed to extend horizontally toward the rotation center axis 10 of the tire 2 having been carried in.

The print head 61 is attached to the lower end, for instance, of an extension member 126 extending vertically from the slider 124B of the radial-direction moving mechanism 124.

Provided right behind the print head 61 is an ink drying means, such as the above-described UV lamp or the like. Note that the term "right behind the print head 61" means a hind position in the progress direction of the printing by the print head 61.

The control unit 100, which is a so-called computer, is provided with a CPU as computing means, ROM and RAM as storage means, and input/output interface as communication means. The storage means stores a control program for controlling the operations for tire printing, and the operations for printing on a tire are controlled by executing the control program.

The control unit 100 includes a tire position setting control means 170, a shape measuring control means 171, a height difference detecting means 172, a height difference determining means 173, and a printing control means 175.

The tire position setting control means 170 includes an inter-bead width control means 176 and an internal pressure control means 177 for the control of the vertical motion of the cylinder 133a of the lifting/lowering means 133 and air supply motion by the on-off operation of the air supply source 148.

The inter-bead width control means 176 controls the distance along the rotation center axis 10 between the upper and lower bead regions 24, 24 of the tire 2 when the tire 2 is supported by the lower rim body 135 and the upper rim body 145 by controlling the vertical motion of the cylinder 133a of the lifting/lowering means 133. In the present embodiment, the distance from the smaller diameter face 135a of the lower rim body 135 to the smaller diameter face 145a of the upper rim body 145 is defined as the inter-bead width C between the bead regions 24, 24. That is, the inter-bead width control means 176 has the function as inter-bead distance adjusting means for adjusting the distance along the rotation center axis 10 of the tire 2 between the bead regions 24, 24.

More specifically, the inter-bead width control means 176 performs the control for holding the tire 2 between the lower rim body 135 and the upper rim body 145 by raising the lower rim body 135, the control for setting, as the reference distance according to the size of the tire 2, the distance between the lower rim body 135 and the upper rim body 145 as the bead regions 24 of the tire 2 engage with the engaging portions 139 and 149, and the control for adjusting the distance between the lower rim body 135 and the upper rim body 145 set at the reference distance either closer to each other or apart from each other incrementally by a predetermined distance (at predetermined distance intervals). In other words, the inter-bead width control means 176 performs the control of adjusting the distance between the bead regions 24 of the tire 2 by changing the distance between the lower rim body 135 and the upper rim body 145 after holding the tire 2 at the reference distance therebetween. And in this manner the tire 2 is supported by the lower rim body 35 and the upper rim body 45. In this embodiment, the reference distance to be used may be the smallest rim width of the recommended rim width when the tire 2 is fitted onto the wheel rim.

The internal pressure control means 177 controls the air pressure to be supplied to the tire 2 supported by the lower rim body 135 and the upper rim body 145. More specifically, the internal pressure control means 177 performs control in applying a reference internal pressure to the tire 2 supported by the lower rim body 135 and the upper rim body 145 and control in adjusting the internal pressure by raising or lowering it incrementally by a predetermined pressure (at predetermined pressure intervals) from the reference internal pressure. In the present embodiment, the reference internal pressure used is a pressure which is a half of the specified internal pressure specified for each tire type. Note that the specified internal pressure is stored in advance in the storage means. It is also to be noted that the internal pressure of the tire 2 must be set under such condition that the specified internal pressure is its upper limit.

The shape measuring control means 171 controls the rotating motion of the lower rim body 135, the on-off operation of the displacement sensor 51, and the operation of the sensor moving mechanism 52. In doing so, the shape measuring control means 171 measures a plurality of times the surface profile F of a predetermined range X on the side face 3, which is the surface for printing located below the displacement sensor 51, by operating the displacement sensor 51 a plurality of times during a single rotation of the tire 2.

The height difference detecting means 172 detects a highest position value and a lowest position value from the surface profile F obtained by the displacement sensor 51 during a single rotation of the tire 2 and detects the difference between the highest position value and the lowest position value. In the present embodiment, information on the highest point P and the lowest point Q of the profile of the upper side face 3 is detected from each of the surface profiles F of the side face 3 obtained a plurality of times along the circumferential direction of the tire by the displacement sensor 51. Then the mean values of the highest position values and the lowest position values for the full circle of the tire are calculated, and the height difference H1 (see FIG. 8) of the side face 3 of the tire 2 is calculated as the difference between the mean value of the highest position values and the mean value of the lowest position values. It is to be noted that the height information showing the highest position values and the lowest position values are given as the distances from the displacement sensor 51 to the side face 3 as measured by the displacement sensor 51.

The height difference determining means 173 determines whether the height difference H1 of the side face 3 of the tire 2 detected by the height difference detecting means 172 is within the predetermined difference or not. More specifically, when the height difference H1 of the surface profile F is larger than the predetermined difference, the height difference determining means 173 repeats the determination process until the height difference H1 becomes the predetermined difference or less, and besides the least of the values, by changing the distance between the lower rim body 135 and the upper rim body 145 or the internal pressure of the tire 2 with signals outputted to the inter-bead width control means 176 and/or the internal pressure control means 177.

The printing control means 175 controls the printing operation of the print head 61, the operation of the print head moving mechanism, and the operation of the ink drying means. After a printing is done on the side face 3 by driving the print head 61, the rotation of the tire 2 is so controlled as to bring the printed part to the position below the UV lamp as the ink drying means. Thus, the ink at the printed part is dried immediately after the printing so that all colors can be printed before the tire makes a full circle.

Figure 9:
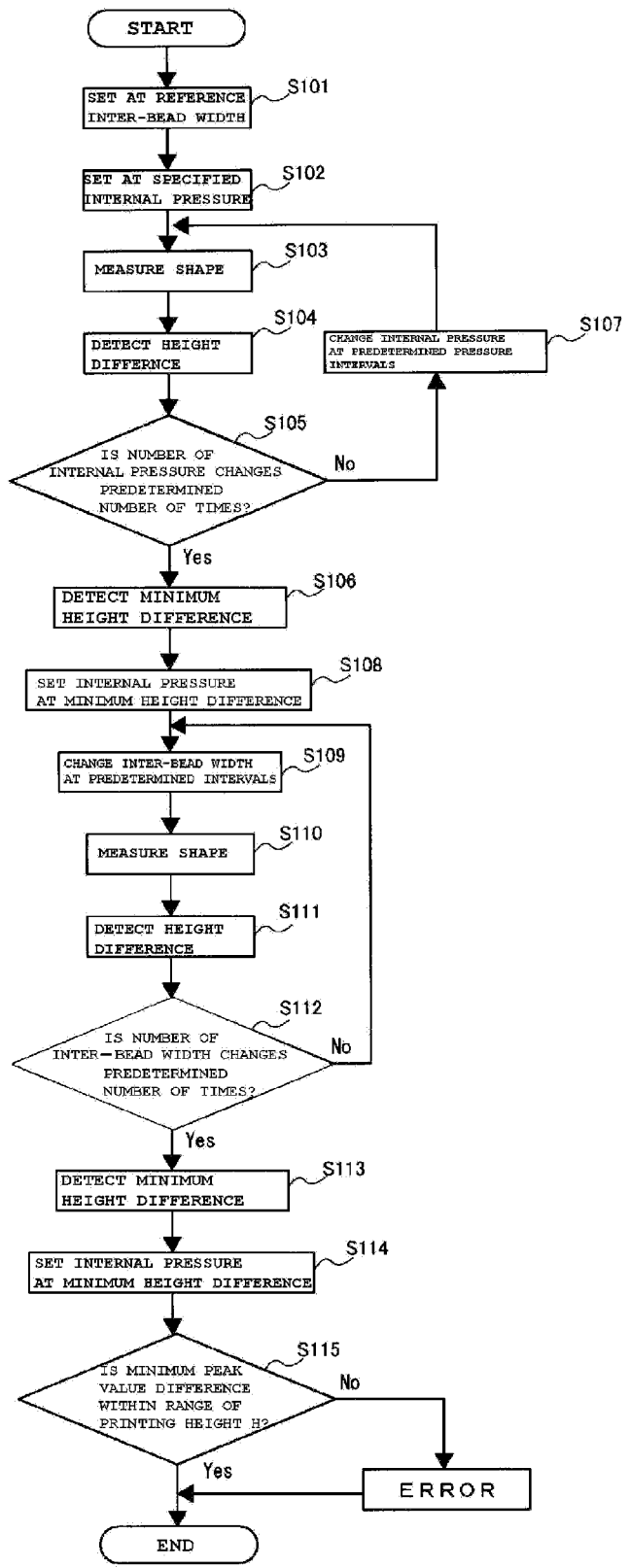
FIG. 9 is a flowchart for control for flattening the side face.

Hereinbelow, a description is given of a method for setting a tire 2 with reference to FIG. 9.

When the tire 2 for printing is carried to the printing position on the conveying means 5, the procedure for setting the tire 2 is executed in preparation for printing.

First, in step S101, the cylinder 133a is operated to make an upward motion with the inter-bead width control means 176 of the control unit 100 controlling the lifting/lowering means 133. This moves the lower rim body 135 upward until the side engaging surface 139B of the lower rim body 135 comes in contact with the outer surface portion 24B of the bead region 24 as the inner periphery engaging surface 139A of the lower rim body 135 is fitted to the inner peripheral portion 24A of the bead region 24. After this, the cylinder 133a is further operated to make an upward motion until the outer surface portion 24B of the bead region 24 comes in contact with the side engaging surface 149B of the upper rim body 145 as the inner peripheral portion 24A of the bead region 24 is fitted to the inner periphery engaging surface 149 of the upper rim body 145. Thus, the distance of the lower rim body 135 from the upper rim body 145, that is, the distance between the bead regions 24, 24, is set to the reference distance.

Next, in step S102, air is injected into the tire 2 made airtight by the lower rim body 135 and the upper rim body 145 until the internal pressure reaches the reference internal pressure, with the internal pressure control means 177 driving the air supply source 148 of the air injection unit 147.

As a result, the outer surface portions 24B of the bead regions 24 come into closer contact with the side engaging surfaces 139B and 149B of the lower and upper rim bodies 135 and 145, and the upper side face 3 for printing becomes flattened with a smallest possible height difference H1 thereof.

Next, in step S103, the shape measuring control means 171 controls the on-off operation of the displacement sensor 51, the operation of the sensor moving mechanism 52, and the operation of the rotary motor 132. In doing so, the shape measuring control means 171 measures a plurality of times the surface profile F of a predetermined range X on the side face 3 located below the displacement sensor 51 by operating the displacement sensor 51 a plurality of times during a single rotation of the tire 2.

Thus, during a single rotation of the tire 2, position information on the side face 3 and height information on the side face 3 are obtained a plurality of times in the circumferential direction of the tire 2. It is to be noted that in the measurement of the surface profile F, the shorter the interval between measurements, the higher the accuracy of the measurement will be.

Next, in step S104, the height difference detecting means 172 detects a highest position value and a lowest position value from each of the plurality of surface profiles F obtained during a single rotation of the tire 2 and then detects the height difference H1, which is the difference between the highest position value and the lowest position value.

Next, in step S105, the height difference determining means 173 determines whether the number of changes of the internal pressure has reached the predetermined number of times. And if the predetermined number of times has been reached, the procedure goes to step S106. If the predetermined number of times has not been reached, the procedure goes to step S107 where the internal pressure of the tire 2 is changed at predetermined pressure intervals. And the procedure from step S103 to step S104 is repeated until the number of changes of the internal pressure has reached the predetermined number of times.

In step S106, the minimum height difference, which is the smallest height difference H1 of the plurality of height differences H1 obtained by a plurality of times of changes of the internal pressure, is detected by the height difference detecting means 172. Then the procedure moves to step S108 where the internal pressure of the tire 2 is set to the internal pressure when the minimum height difference is detected.

In step S109, upon the setting of the internal pressure of the tire 2, the inter-bead width C is changed by changing the distance between the bead regions 24, 24 at predetermined distance intervals by the inter-bead width control means 176.

Next, in step S110, the shape measuring control means 171 controls the on-off operation of the displacement sensor 51, the operation of the sensor moving mechanism 52, and the operation of the rotary motor 132 and thereby measures the surface profile F of a predetermined range X on the side face 3 a plurality of times during a single rotation of the side face 3 of the tire 2.

Next, in step S111, the height difference detecting means 172 again detects highest position values and lowest position values from the plurality of measurement results obtained during a single rotation of the tire 2 and then detects the height difference H1, which is the difference between the highest position value and the lowest position value. The height difference H1, as shown in FIG. 6, changes with the change in the inter-bead width C, and the lowest position value shifts within the predetermined range X exposed to the laser beam a from the bead region 24 side to the tread region 21 side.

Next, in step S112, the height difference determining means 173 determines whether the number of changes of the inter-bead width C has reached the predetermined number of times. And if the predetermined number of times has been reached, the procedure goes to step S23. If the predetermined number of times has not been reached, the procedure from step S109 to step S111 is repeated. And after the inter-bead width C of the tire 2 is further changed at predetermined distance intervals, the step of detecting the height difference H1 by measuring the surface profile F is repeated.

In step S23, the minimum height difference, which is the smallest height difference H1 of the plurality of height differences H1 obtained by a plurality of times of changes of the inter-bead width C is detected by the height difference detecting means 172. Then the procedure moves to step S24 where the inter-bead width C of the tire 2 is set to the inter-bead width C when the minimum height difference is detected.

Next, in step S115, upon the setting of the inter-bead width C, it is determined whether the height difference H1 of the surface profile F when the internal pressure and the inter-bead width C are finally set is within the height range that permits printing. And if it is within the printable range, the position setting of the tire 2 is completed by outputting the signal to the printing control means. If it is outside the printable range, the procedure is terminated by reporting "ERROR". The height difference H1 within the printable height range is set at 10 mm of less, for instance. With the height difference H1 adjusted to within 10 mm, the ink can be directed accurately at the side face 3 of the tire 2, thereby realizing printing with high precision.

Thus, the nozzle face 61a of the print head 61 is located at a position apart from the side face 3, which is the height of the highest position value for the minimum height difference, with the printing control means 175 controlling the printing means 6. Then a printing is carried out on the side face 3 with the position of the print head 61 held constant and by driving the print head 61 in cooperation with the rotation of the tire 2.

It should be noted that when there is any change in the width size, diameter, or the like of the tire 2, adjustments are to be made to the positions in the radial and axial directions of the tire 2 of the displacement sensor 51, the print head 61 and the UV lamp by controlling the sensor moving mechanism 52, the print head moving mechanism 162, and the ink drying means moving mechanism.

Hereinbelow, a description is given of the behavior of the side face 3 of the tire 2 when the internal pressure and the inter-bead width C are changed, with reference to FIG. 10 and FIG. 11.

Figures 10A, 10B:
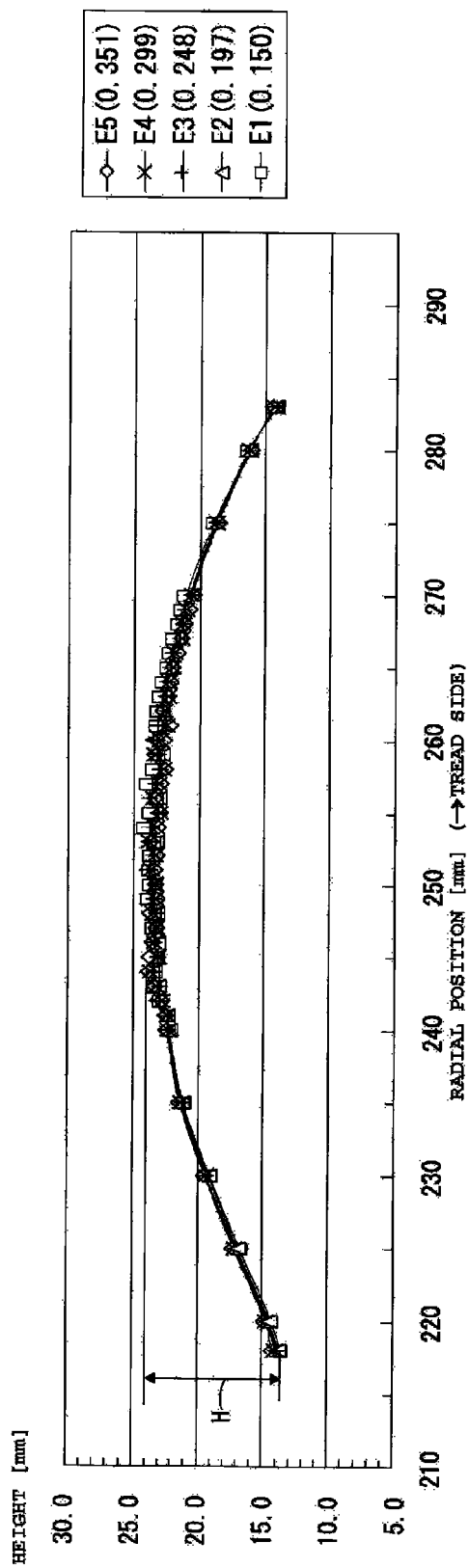
FIGS. 10(a) and 10(b) show an example showing changes in surface profile when the internal pressure is changed.

FIG. 10A shows changes in the surface profile F of a tire 2 when the tire 2 is supported by the lower rim body 135 and the upper rim body 145 with a reference distance in between and then the air pressure in the tire 2 is raised from the reference internal pressure by applying it incrementally by a predetermined pressure. Also, FIG. 10B is a table showing the highest position values, the lowest position values, and the height differences H1 for the respective surface profiles F. In the present embodiment, the reference internal pressure employed is 0.150 MPa, which is equivalent to a half of the specified internal pressure, and the predetermined pressure for incremental increase (predetermined pressure interval) is 0.05 MPa. As is indicated in FIG. 10A, it is evident that when the internal pressure of the tire 2 is increased from the reference internal pressure with the inter-bead width C of the tire 2 set at the reference distance, the height difference H1, which is the difference between the highest position value and the lowest position value of the surface profile F, tends to get smaller gradually. Hence, when the internal pressure is set at 0.351 MPa, the height difference H1 of the side face 3 is the smallest, indicating the flattest side face 3. With the internal pressure of the tire 2 set at this internal pressure, the change in the distance between the side face 3 and the print head 61 can be minimized.

Figures 11A, 11B:
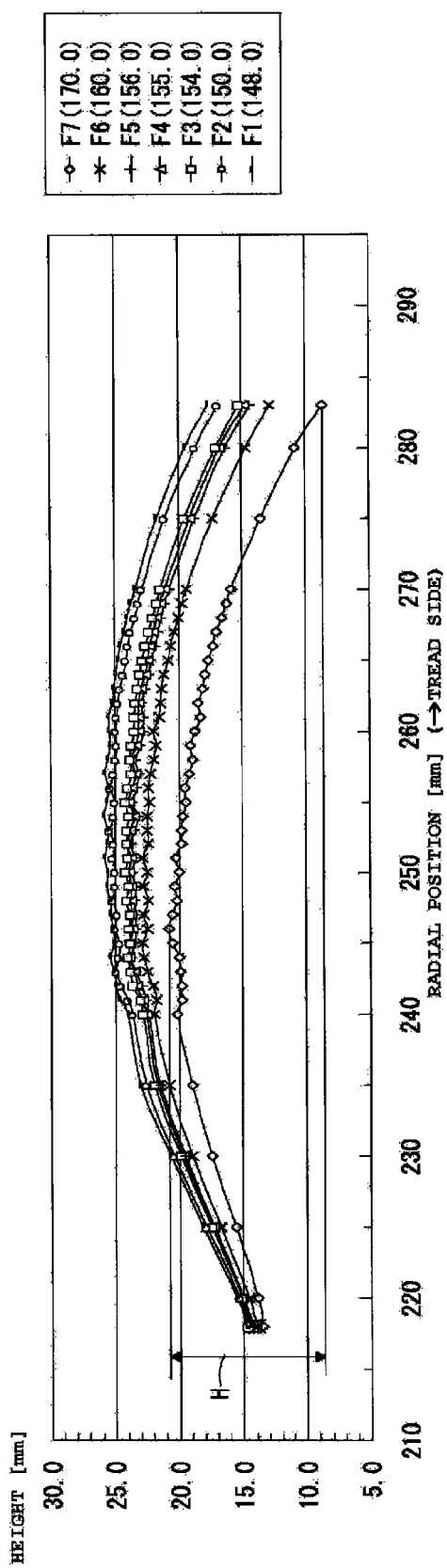
FIGS. 11(a) and 11(b) show an example showing changes in surface profile when the inter-bead width is changed.

FIG. 11A shows changes in the surface profile F of a tire 2 when the tire 2 is supported by the lower rim body 135 and the upper rim body 145 with a reference distance in between and then the inter-bead width C is increased from the reference distance at predetermined distance intervals with the reference internal pressure applied. Also, FIG. 11B is a table showing the highest position values, the lowest position values, and the height differences H1 for the respective surface profiles F. In the present embodiment, the reference distance of the inter-bead width C employed in the determination of the changes in the surface profile F is 148 mm, the reference internal pressure 0.351 MPa, and the predetermined distance interval for incremental increase 1 mm. Note that FIG. 11B shows thinned-out results to clearly show the changes in the surface profile F. As is indicated in FIGS. 11A and 11B, it is evident that when the inter-bead width C is increased from the reference distance with the reference internal pressure applied to the tire 2, the height difference H1, which is the difference between the highest position value and the lowest position value of the surface profile F, tends to get smaller gradually as is shown by F1 to F5. However, as is shown by F6 and F7, when the inter-bead width C is too wide, the height difference H1 becomes large again. Hence, by changing the inter-bead width C in such a manner as to make the height difference H1 the smallest, the height difference H1 of the side face 3 can be reduced the most, thereby flattening the side face 3 and minimizing the change in the distance between the side face 3 and the print head 61.

Therefore, it is possible to make the height difference H1 of the side face 3 of the tire 2 smaller by changing either the internal pressure or the inter-bead width C of the tire 2. And this realizes highly precise printing on the side face 3 of the tire 2.

Also, as explained in the foregoing embodiment, the side face 3 of the tire 2 may be flattened to make the height difference H1 of the side face 3 the smallest by changing both the internal pressure and the inter-bead width C.

That is, a specified internal pressure is applied to the tire 2 supported by the lower and upper rim bodies 135 and 145 at a reference inter-bead width, and the shape of the side face 3 for printing is measured with the internal pressure changed incrementally by a predetermined pressure (at predetermined pressure intervals). Then after the internal pressure is set at the pressure when the height difference H1 between the highest position value and the lowest position value of the measured shapes becomes the smallest, the shape of the side face 3 for printing is further measured with the distance between the bead regions 24, 24 changed from the reference inter-bead width incrementally by a predetermined distance. Thus, the inter-bead width C is set at the width when the height difference H1 between the highest position value and the lowest position value of the measured shapes becomes the smallest, thereby further flattening the surface profile F of the side face 3.

Also, printing is carried out with the tire 2 held on its side. Accordingly, the discharge direction of ink droplets coincides with the direction of gravitational force, which improves the precision of the landing position on the side face 3 of the ink ejected from the print head 61. That is, the ink ejected from the print head 61 flies in minute ink droplets through the gap between the print head 61 and the side face 3 before it lands on the side face 3. Hence, if a printing is done on the side face 3 with the tire 2 held vertically, then the ink ejected from the print head 61 and flying toward the side face 3 will be pulled in the direction of gravitational force. As a result, the precision of the landing position of ink on the side face 3 will be lost. Therefore, holding the tire 2 on its side can realize a highly precise printing thereon.

In the eighth embodiment, the reference internal pressure is set at a half of the specified internal pressure, and the reference distance of the inter-bead width C at the narrowest width of the recommended rim width. As a result, the height difference H1 of the surface profile F of the side face 3 is made smaller by increasing the internal pressure or the inter-bead width C. However, it should be noted that if the reference internal pressure is set at the specified internal pressure, and the reference distance of the inter-bead width C at the widest width of the recommended rim width, then it is possible to make the height difference H1 of the surface profile F of the side face 3 smaller by decreasing the internal pressure or the inter-bead width C.

As described in the eighth embodiment, the internal pressure of the tire 2 when the height difference H1 of the side face 3 thereof becomes the smallest by changing the internal pressure from the reference internal pressure is first detected after setting the inter-bead width C at the reference inter-bead width. Then after the internal pressure of the tire 2 is set at the detected internal pressure, the inter-bead width C when the height difference H1 of the side face 3 becomes the smallest is detected by further changing the inter-bead width C. In this manner, the inter-bead width C of the tire 2 is set at the thus detected inter-bead width C. However, the arrangement may be such that the inter-bead width C is first set at the width at which the height difference H1 of the surface profile F of the side face 3 becomes the smallest and then the internal pressure of the tire is set at the pressure at which the height difference H1 of the surface profile F of the side face 3 becomes the smallest by changing the internal pressure.

Also, in the eighth embodiment, the nozzle face 61a of the print head 61 is set at the height of the highest position value when the height difference is the smallest. However, the arrangement may be such that the printing clearance between the side face 3 and the print head 61 is set to an optimum interval sequentially along the rotation of the tire 2.

In the eighth embodiment, an example is cited in which the surface profile F of the side face 3 is measured by rotating the tire 2. However, the position information and the height information on the side face 3 at predetermined angular positions around the rotation center axis 10 of the tire 2 may be measured by moving the displacement sensor 51 in the circumferential direction along the side face 3.

In the eighth embodiment, an example is cited in which printing is done by rotating the tire 2. However, printing may be done by moving the print head 61 in the circumferential direction along the side face 3.

DESCRIPTION OF REFERENCE NUMERALS 1, 1A tire printing apparatus
2 tire
3 side face
24 bead region
51 two-dimensional displacement measuring sensor
61 print head
61a nozzle face
61b nozzles
71 peak value detecting means
72 printing clearance setting means
146 shape measuring means
H printing clearance

The invention claimed is:

1. A tire printing method for performing a printing on a side face of a tire by discharging ink from nozzles of a print head disposed to face the side face of the tire, the method comprising:
holding bead regions of a tire individually by a pair of holding means;
disposing the print head to face the side face of the tire;
measuring a surface profile in the radial direction of the side face facing the print head of the tire held by the holding means, using a two-dimensional displacement measuring sensor disposed to face the side face of the tire; and
adjusting the distance between the bead regions of the tire by controlling the holding means to reduce the height difference of the surface profile measured by the two-dimensional displacement measuring sensor.

2. The tire printing method according to claim 1, further comprising applying an internal pressure in the tire before measuring a surface profile in the radial direction of the side face.

3. The tire printing method according to claim 2, wherein the internal pressure of the tire is a normal internal pressure specified by JATMA or below as reference.

4. The tire printing method according to claim 1, wherein printing is done with the tire placed on a side thereof.

5. A tire printing method for performing a printing on a side face of a tire, the method comprising:
acquiring side face information by simultaneously acquiring position information and height information on the side face of the tire as side face information, using a two-dimensional displacement measuring sensor disposed to face the side face of the tire;
setting a printing clearance between nozzles of a print head disposed to face the side face of the tire and the side face of the tire based on the height information acquired in the acquiring the side face information; and performing a printing on the side face of the tire by discharging ink from the nozzles of the print head positioned to face the side face the tire at the printing clearance set in the setting the printing clearance,
wherein the acquiring the side face information comprises acquiring position information and height information of the side face a plurality of times by rotating the tire around the central axis line of the tire as the rotation center, and the setting the printing clearance comprises setting the printing clearance based on the peak value of the height information acquired in the acquiring the side face information.

6. The tire printing method according to claim 5, wherein the setting the printing clearance comprises setting the printing clearance based on the rotation angle information of the tire or the movement position information of the two-dimensional displacement measuring sensor and the peak value of the height information of the side face acquired in the acquiring the side face information when the print head is moved in a circumferential direction along the side face.

7. The tire printing method according to claim 5, wherein the setting the printing clearance comprises setting the printing clearance based on the position information and the height information of the side face acquired in the acquiring the side face information when the print head is moved in a circumferential direction along the side face.

8. The tire printing method according to claim 5, wherein the setting the printing clearance comprises setting the printing clearance within a range of 2 mm to 8 mm.

9. The tire printing method according to claim 5, wherein the performing the printing comprises performing a printing operation by a plurality of nozzle groups for the same region on the side face, the plurality of nozzle groups being a plurality of nozzles provided in the print head divided into a plurality of nozzle groups.

10. A tire printing method for performing a printing on a side face of a tire, the method comprising:
acquiring side face information by simultaneously acquiring position information and height information on the side face of the tire as side face information, using a two-dimensional displacement measuring sensor disposed to face the side face of the tire;
setting a printing clearance between nozzles of a print head disposed to face the side face of the tire and the side face of the tire based on the height information acquired in the acquiring the side face information; and performing a printing on the side face of the tire by discharging ink from the nozzles of the print head positioned to face the side face the tire at the printing clearance set in the setting the printing clearance,
wherein the acquiring the side face information comprises acquiring position information and height information of the side face a plurality of times by moving the two-dimensional displacement measuring sensor in a circumferential direction along the side face, and the setting the printing clearance comprises setting the printing clearance based on the peak value of the height information on the side face acquired in the acquiring the side face information.

11. The tire printing method according to claim 10, wherein the setting the printing clearance comprises setting the printing clearance based on the position information and the height information of the side face acquired in the acquiring the side face information when the print head is moved in a circumferential direction along the side face.

12. A tire printing apparatus comprising:
a two-dimensional displacement measuring sensor for simultaneously acquiring position information and height information of a side face of a tire;
a print head disposed to face the side face of the tire; and
a printing clearance setting means for setting a printing clearance between nozzles of the print head and the side face of the tire based on the height information acquired by the two-dimensional displacement measuring sensor,
wherein the two-dimensional displacement measuring sensor acquires side face information comprising position information and height information of the side face acquired a plurality of times by rotating the tire around the central axis line of the tire as the rotation center, and
wherein the printing clearance setting means sets the printing clearance based on a peak value of the height information acquired by the two-dimensional displacement measuring sensor.

13. A tire printing apparatus comprising:
a pair of holding means for individually holding bead regions of a tire;
a print head disposed to face the side face of the tire;
a two-dimensional displacement measuring sensor for measuring a surface profile in the radial direction of the side face facing the print head of the tire held by the holding means; and
an inter-bead distance adjusting means for adjusting the distance between the bead regions of the tire by controlling the holding means to reduce the height difference of the surface profile measured by the two-dimensional displacement measuring sensor.

14. A tire printing apparatus comprising:
a two-dimensional displacement measuring sensor for simultaneously acquiring position information and height information of a side face of a tire;
a print head disposed to face the side face of the tire; and
a printing clearance setting means for setting a printing clearance between nozzles of the print head and the side face of the tire based on the height information acquired by the two-dimensional displacement measuring sensor,
wherein the two-dimensional displacement measuring sensor acquires position information and height information of the side face a plurality of times by moving the two-dimensional displacement measuring sensor in a circumferential direction along the side face, and the printing clearance setting means sets the printing clearance based on the peak value of the height information on the side face acquired by the two-dimensional displacement measuring sensor.

* * * * *